US011912949B2

(12) United States Patent
Cracknell et al.

(10) Patent No.: US 11,912,949 B2
(45) Date of Patent: Feb. 27, 2024

(54) METHOD FOR REDUCING INTAKE VALVE DEPOSITS

(71) Applicant: SHELL OIL COMPANY, Houston, TX (US)

(72) Inventors: Roger Francis Cracknell, London (GB); Joseph Michael Russo, Houston, TX (US); Allen Ambwere Aradi, Houston, TX (US); Andreas Kolbeck, Hamburg (DE)

(73) Assignee: SHELL USA, INC., Houston, TX (US)

( * ) Notice: Subject to any disclaimer, the term of this patent is extended or adjusted under 35 U.S.C. 154(b) by 1 day.

(21) Appl. No.: 17/762,141

(22) PCT Filed: Oct. 20, 2020

(86) PCT No.: PCT/EP2020/079523

§ 371 (c)(1),
(2) Date: Mar. 21, 2022

(87) PCT Pub. No.: WO2021/078753

PCT Pub. Date: Apr. 29, 2021

(65) Prior Publication Data

US 2022/0389339 A1 Dec. 8, 2022

Related U.S. Application Data

(60) Provisional application No. 62/924,422, filed on Oct. 22, 2019.

(51) Int. Cl.

| | |
|---|---|
| ***C10L 1/14*** | (2006.01) |
| ***C10L 1/182*** | (2006.01) |
| ***C10L 1/2387*** | (2006.01) |
| ***C10L 10/14*** | (2006.01) |
| ***F02M 25/022*** | (2006.01) |

(52) U.S. Cl.

CPC ............... *C10L 1/143* (2013.01); *C10L 1/182* (2013.01); *C10L 1/2387* (2013.01); *C10L 10/14* (2013.01); *F02M 25/0228* (2013.01); *C10L 2200/0423* (2013.01); *C10L 2250/04* (2013.01); *C10L 2270/023* (2013.01); *C10L 2300/30* (2013.01)

(58) Field of Classification Search

CPC ........ C10L 1/143; C10L 1/182; C10L 1/2387; C10L 10/14; C10L 2200/0423; C10L 2250/04; C10L 2270/023; C10L 2300/30; C10L 1/125; C10L 1/1824; C10L 1/1826; C10L 1/1985; C10L 1/2227; C10L 1/238; C10L 1/2383; C10L 2250/086; C10L 1/106; C10L 2290/141; C10L 10/04; C10L 10/18; C10L 1/10; F02M 25/0228; F02M 25/14

See application file for complete search history.

(56) References Cited

U.S. PATENT DOCUMENTS

| | | | | |
|---|---|---|---|---|
| 4,877,416 | A | 10/1989 | Campbell | |
| 5,112,364 | A | 5/1992 | Rath et al. | |
| 5,660,601 | A | 8/1997 | Oppenländer et al. | |
| 5,855,629 | A | 1/1999 | Grundy et al. | |
| 8,372,164 | B2 | 2/2013 | Haan et al. | |
| 8,518,130 | B2 | 8/2013 | Croft et al. | |
| 8,557,001 | B2 | 10/2013 | Brewer et al. | |
| 8,709,111 | B2 | 4/2014 | Felix-Moore et al. | |
| 8,741,002 | B2 | 6/2014 | Felix-Moore et al. | |
| 9,206,366 | B2 | 12/2015 | Bauldreay et al. | |
| 2005/0039381 | A1* | 2/2005 | Langer .................... | C10L 1/328 44/302 |
| 2007/0119529 | A1* | 5/2007 | Hobson .................. | C10L 1/143 149/1 |
| 2009/0025283 | A1 | 1/2009 | Garrett et al. | |
| 2010/0000484 | A1 | 1/2010 | Felix-Moore et al. | |
| 2013/0212934 | A1 | 8/2013 | Cantlay et al. | |

FOREIGN PATENT DOCUMENTS

| | | | |
|---|---|---|---|
| EP | 0310875 A1 | | 4/1989 |
| WO | WO8600333 | * | 1/1986 |

OTHER PUBLICATIONS

International Search Report and Written Opinion received for PCT Patent Application No. PCT/EP2020/079523, dated Dec. 8, 2020, 12 pages.

Netzer et al., "Numerical Analysis of the Impact of Water Injection on Combustion and Thermodynamics in a Gasoline Engine Using Detailed Chemistry", SAE International Journal of Engines, vol. 11, Issue No. 6, Feb. 16, 2018, pp. 1151-1166, XP055752947.

Gerty et al., "An Investigation of Gasoline Engine Knock Limited Performance and the Effects of Hydrogen Enhancement", SAE Technical Paper 2006-01-0228, Apr. 3-6, 2006, 23 Pages.

Satpathy et al., "Literature Survey of Water Injection Benefits on Boosted Spark Ignited Engines", SAE Technical Paper 2017-01-0658, Mar. 28, 2017, 9 Pages.

Hermann et al., "Water Injection for Gasoline Engines—Quo Vadis?", Knocking in Gasoline Engines, 2018, pp. 299-321.

Anon. "5 Litres of Water for 500 Horses" https://www.bmw-m.com/en/topics/magazine-article-pool/5-litres-of-water-for-500-horses.html; Oct. 7, 2015, pp. 1-9.

* cited by examiner

*Primary Examiner* — Cephia D Toomer
(74) *Attorney, Agent, or Firm* — SHELL USA, INC.

(57) ABSTRACT

Method for reducing intake valve deposits in a spark ignition internal combustion engine which is fuelled with a gasoline fuel composition, wherein the method comprises introducing into the engine an aqueous based composition, wherein the aqueous based composition comprises (i) water, (ii) from 0 vol % to 40 vol % freezing point suppression agent, (iii) from 0 vol % to 10 vol % of surfactant, and (iv) an amine compound in a blending amount of from 0 ppmw to 1000 ppmw.

13 Claims, No Drawings

METHOD FOR REDUCING INTAKE VALVE DEPOSITS

CROSS REFERENCE TO RELATED APPLICATIONS

This is a National stage application of International application No PCT/EP2020/079523, filed Oct. 20, 2020, which claims priority of U.S. application No. 62/924,422, filed 22 Oct. 2019 which is incorporated herein by reference in its entirety.

FIELD OF THE INVENTION

The present invention relates to a method of reducing intake valve deposits in a spark ignition internal combustion engine. In particular, the method involves introducing an aqueous based composition into the spark ignition internal combustion engine.

BACKGROUND OF THE INVENTION

Under ideal conditions, normal combustion in a conventional spark-ignited engine occurs when a mixture of fuel and air is ignited within the combustion chamber inside the cylinder by the production of a spark originating from a spark plug. Such normal combustion is generally characterized by the expansion of the flame front across the combustion chamber in an orderly and controlled manner.

In recent years, the automotive industry has been witnessing a major shift towards downsized boosted direct injection engines in view of increasingly stringent emissions and fuel consumption standards.

Both Port Fuel Injected (PFI) engines and direct injection spark ignition (DISI) engines (also known as GDI engines) can be susceptible to deposits forming on the intake valves and, in both instances, can lead to a deterioration in the air-flow in combustion. The deposits can derive from the lubricant from either the blow-by circuit or valve stems, or from pyrolised fuel in PFI engines. However, in PFI engines, the injection of a properly formulated fuel on the back of the intake valves can help to mitigate IVD build-up. By contrast, in GDI engines, there is no such fuel washing to remove IVDs. GDI and PFI engines can also suffer from deposits in the injector holes which can result in a poor spray pattern and poor drivability. Deposits which form on the face of the GDI injector have been shown to cause an increase in soot formation which leads to higher emissions and increase in lubricant viscosity leading to poor fuel economy. In addition, combustion chamber deposits, which form in both GDI and PFI injection systems, have been associated with higher particulate and NOx emissions.

The major consequences of engine downsizing are the high levels of in-cylinder pressure and thermal loading, which results in increased possibility of abnormal combustion phenomena called knock. According to Gerty, M. and Heywood, J., "An Investigation of Gasoline Engine Knock Limited Performance and the Effects of Hydrogen Enhancement," SAE Technical Paper 2006-01-0228 2006, the term 'knock' describes the sound resulting from the spontaneous ignition of the unburned air-fuel mixture ahead of the advancing turbulent flame front. Knock can also lead to damage in the engine, and modern vehicles tend to have a sensor that can detect knock onset and to change the spark timing to eliminate it. However changing the spark timing leads to reduced engine efficiency and higher emissions.

Water injection has been used as an effective technique to reduce end gas temperatures and hence control engine knock in highly boosted engines. Further, water injection allows optimal efficiency because it removes the need for retarding the spark timing. Rohit, A., Satpathy, S., Choi, J., Hoard, J. et al, "Literature Survey of Water Injection Benefits on Boosted Spark Ignited Engines", SAE Technical Paper 2017-01-0658, 2017, doi:10.4271/2017-01-0658 examines the prior research in using water injection to extend knock limit in boosted spark ignition engines, and its potential effects on performance and emissions.

Netzer, C., Franken, T., Lehtiniemi, H. et al., "Numerical Analysis of the Impact of Water Injection on Combustion and Thermodynamics in a Gasoline Engine using Detailed Chemistry," SAE Technical Paper 2018-01-0200, 2018, doi: 10.4271/2018-01-0200 examines the impact of different chemical and physical quantities of water injection on the combustion process in a boosted spark ignition engine.

The article disclosed at https://www.bmw-m.com/en/topics/magazine-article-pool/5-litres-of-water-for-500-horses.html describes a water injection system in a BMW M4 GTS. The authors of this article report that this water injection system further improves the full-throttle power and fuel consumption of the turbocharged straight-six engine. It is described therein that water is injected as a fine spray into the intake manifold plenum chamber where it evaporates, significantly lowering the temperature of the intake air. According to this article, this water injection reduces the final compression temperature in the combustion chamber which also reduces the rise of knock, allowing the turbocharged engine to operate with higher boost pressure and earlier spark timing and providing increased power and torque.

I Herman in Springer International Publishing AG 2018 M. Gunther and M Sens (eds.), Knocking in Gasoline Engines, https://doi.org/10.1007/978-3-319-69760-4_18, indicates that port water injection (with directly injected fuel) was the easiest embodiment to implement.

Although water injection is known for controlling knock in boosted spark ignition engines, it has so far not been used as a way of controlling intake valve deposits. It would be desirable to use a water injection system as a means to simultaneously control both intake valve deposits and knock in direct injection spark ignition engines, as well as in port fuel injection spark ignition engines.

It has surprisingly been found that the aqueous based composition described hereinbelow can be used to control intake valve deposits in a spark ignition internal combustion engine, in addition to knock.

SUMMARY OF THE INVENTION

According to the present invention there is provided a method for reducing intake valve deposits in a spark ignition internal combustion engine fuelled with a gasoline fuel composition, wherein the method comprises introducing into the engine an aqueous based composition, wherein the aqueous based composition comprises (i) water, (ii) from 0 vol % to 40 vol % of freezing point suppression agent, (iii) from 0 vol % to 10 vol % of surfactant, and (iv) an amine compound in a blending amount of from 0 ppmw to 1000 ppmw.

According to a further aspect of the present invention there is provided the use of an aqueous based composition for reducing intake valve deposits in a spark ignition internal combustion engine fuelled with a gasoline fuel composition, wherein the aqueous based composition comprises (i) water, (ii) from 0 vol % to 40 vol % of freezing point suppression agent, (iii) from 0 vol % to 10 vol % of surfactant, and (iv) an amine compound in a blending amount of from 0 ppmw to 1000 ppmw. It has surprisingly been found that the uses and methods of the present invention advantageously reduce intake valve deposits in all spark ignition internal combustion engines, especially in a direct injection spark ignition (GDI) engine. The present invention is particularly advantageous in a direct injection spark ignition (GDI) engine since there is no direct washing mechanism to clean the intake valves by the fuel.

Further, it has surprisingly been found that the uses and methods of the present invention can advantageously reduce intake valve deposits in a spark ignition internal combustion engine, in particular a direct injection spark ignition engine, as well as reducing engine knock.

DETAILED DESCRIPTION OF THE INVENTION

An essential component of the aqueous based composition used in the present invention (component (i) herein) is water. The aqueous based composition for use herein should be compatible with all types of spark ignition engines.

An optional, highly preferred component (component (ii) herein) of the aqueous based composition herein, is a freezing point suppression agent. As used herein the term ‘freezing point suppression agent’ means a component which has the ability to reduce the freezing point of the aqueous based composition to which it is added.

Any freezing point suppression agent suitable for use in an internal combustion engine can be used herein.

Suitably, the freezing point suppression agent is selected from an alcohol, a glycol, such as an alkylene glycol, a dialkylcarbamate, and mixtures thereof. Examples of suitable freezing point suppression agents include methanol, ethanol, propanol, isopropanol, butanol, isobutanol, ethylene glycol, propylene glycol, diethylcarbamate, and mixtures thereof.

Suitable alcohols for use as a freezing point suppression agent include low molecular weight alcohols including, but not limited to, methanol, ethanol, propanol, iso-propanol, iso-butyl alcohol, secondary butyl alcohol, n-butyl alcohol, t-butyl alcohol, and mixtures thereof. Suitable alcohols for use as a freezing point suppression agent also include alkoxylated low molecular weight alcohols including, but not limited to, isobutyl alcohol with 1 to 15 alkylene oxide groups, preferably 1 to 4 alkylene oxide groups. The alkylene oxide groups may comprise any alkylene oxide groups. For example, said alkylene oxide groups may comprise methylene oxide groups, ethylene oxide groups, propylene oxide groups and butylene oxide groups or a mixture thereof, such as a mixture of ethylene oxide and propylene oxide groups. Such mixture may be random or blockwise.

Suitable glycols for use as a freezing point suppression agent include, but are not limited to, ethylene glycol, 1,3-propanediol, 1,2-propanediol, diethylene glycol butyl ether, triethylene glycol butyl ether, and mixtures thereof.

In a preferred embodiment herein, the freezing point suppression agent is an alcohol, preferably selected from methanol, ethanol, propanol, isopropanol, butanol, isobutanol, and mixtures thereof, more preferably selected from methanol, ethanol, propanol, isopropanol, and mixtures thereof, especially isopropanol.

The freezing point suppression agent is preferably present at a level of up to 40 vol %, more preferably from 1 to 40 vol %, even more preferably from 1 vol % to 30 vol %, especially from 5 vol % to 30 vol %, and more especially from 10 vol % to 20 vol %, based on the total volume of components (i), (ii) and (iii).

Another highly preferred component for inclusion in the aqueous based composition herein is a surfactant (component (iii)). Said surfactant does not encompass the amine compound described hereinbelow. Suitable surfactants herein include nonionic, anionic, cationic and amphoteric surfactants, and mixtures thereof.

Preferably, the surfactant used herein is selected from one or more nonionic surfactants, preferably having an HLB in the range from 9 to 14.4, more preferably from 12 to 14.4, even more preferably from 12.4 to 14.4, and especially from 12.4 to 13.6.

Examples of nonionic surfactants suitable for use herein include alkyl alcohol ethoxylates (such as Surfonic L24-12, Surfonic L24-9, Surfonic L24-4, Surfonic L12-8, Surfonic L12-6 and Surfonic TDA-6, all commercially available from Indorama, and Alchem 111, Alchem 123 and Alchem 123, all commercially available from Sasol), alkylphenol ethoxylates (such as Surfonic N100 and Surfonic N60, both commercially available from Indorama and Tergitol NP10 and Tergitol NP 8, both commercially available from Dow Chemical), alkyl acid ethoxylates (such as the Teric series commercially available from Indorama), alkyl acid esters of polyhydroxy compounds (such as glycerol monostearate, glycerol monolaurate and glycerol monooleate), alkyl acid esters of sorbitol (such as the Ecoteric T series commercially available from Indorama), alkyl acid esters of sucrose, alkyl polyglucosides (such as decyl, lauryl and octyl glucoside), amine oxides (such as the Oxamin series commercially available from Indorama), polyoxyethylene alkyl ethers, polyoxyalkylene dialkyl ethers and the like, and mixtures thereof.

Preferably the surfactant is selected from alkyl alcohol ethoxylates, alkyl phenol ethoxylates, and mixtures thereof.

In one embodiment of the present invention, the surfactant is an alkyl ethoxylate, preferably an alkyl ethoxylate having a C10-C16 alkyl group and containing from 6 to 12 ethylene oxide moieties. Examples of suitable alkyl ethoxylates for use herein include C12-C16 fatty alcohol ethoxylate having 12 ethylene oxide moieties, C12-C16 fatty alcohol ethoxylate having 9 ethylene oxide moieties, C12-C16 fatty alcohol ethoxylate having 4 ethylene oxide moieties, C10-C12 fatty alcohol ethoxylate having 8 ethylene oxide moieties, C10-C12 fatty alcohol ethoxylate having 6 ethylene oxide moieties, and isotridecyl alcohol ethoxylate having 6 ethylene oxide moieties.

In another embodiment of the present invention, the surfactant is an alkyl phenol ethoxylate, preferably a C6-C10 alkyl phenol ethoxylate having from 6 to 12 ethylene oxide moieties. Examples of suitable alkyl phenol ethoxylates for use herein include nonyl phenol ethoxylate containing 6 ethylene oxide moieties and nonyl phenol ethoxylate containing 10 ethylene oxide moieties.

The surfactant is present at a level of from 0 vol % to 10 vol %, preferably at a level from 1 to 10 vol %, more preferably from 0.5 vol % to 5 vol %, even more preferably from 0.5 vol % to 2 vol %, based on the total volume of components (i), (ii) and (iii).

In the case where the surfactant comprises a mixture of two or more surfactants, the levels provided above for the amount of surfactant refers to the total level of surfactant in the aqueous based composition.

It has been surprisingly found that the combination of surfactant and amine compound in the aqueous based composition benefits all types of engines, in particular higher compression engines such as is typical in GDI engines.

A highly preferred component of the aqueous based composition herein is an amine compound having amphiphilic properties (component (iv)). Suitably, the amine compound is selected from polyalkylene based amine compounds, polyetheramine compounds, and mixtures thereof.

Suitable polyalkylene based amine compounds include polyisobutylene amines, polypropylene amines, Mannich amines, polyisobutylene succinimides, polypropylene succinimides and mixtures thereof.

A particularly preferred amine compound for use herein is a polyetheramine, such as an alkyl or alkyaryl polyetheramine. Suitable alkyl or alkylaryl polyetheramines contain amino groups attached to a polyether backbone. The polyether backbone is based on an alkylene oxide moiety, such as propylene oxide (PO), ethylene oxide (EO), butylene oxide (BO), mixed BO/PO/EO, and the like.

Examples of suitable polyetheramines are compounds comprising polyoxy-$C_2$-$C_4$-alkylene moieties which are obtainable by reacting $C_2$-$C_{60}$-alkanols, $C_6$-$C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group, and, by subsequent reductive amination with ammonia, monoamines or polyamines. Such products are described in particular in EP-A-310 875, EP-A-356 725, EP-A-700 985 and U.S. Pat. No. 4,877,416. For example, the polyether amines used may be poly-$C_2$-$C_6$-alkylene oxide amines or functional derivatives thereof. Typical examples thereof are the reaction products of the following compounds with ammonia: tridecanol butoxylates or isotridecanol butoxylates, isononylphenol butoxylates and also polyisobutenol butoxylates and propoxylates.

In a preferred embodiment herein, the polyetheramine is XJT 958 (commercially available from Indorama) which is a nonyl phenol amine containing PO/BO groups in a weight ratio of 65:35 (PO/BO).

The amine compound is present in the aqueous based composition at a blending amount from 0 ppmw to 1000 ppmw, preferably from 100 ppmw to 450 ppmw, more preferably from 200 ppmw to 400 ppmw, even more preferably from 300 ppmw to 400 ppmw. It should be noted that ppmw as referred to herein in relation to the amine compound means the weight parts of the amine compound per million weight parts of components (i), (ii) and (iii) in combination.

An optional, but preferred, component of the aqueous based composition herein is a corrosion inhibitor. Examples of suitable corrosion inhibitors include Octel DCI 11 (commercially available from Innospec), Tolad 3224 (commercially available from Petrolite), and Bio Tec 9881 (commercially available from Afton). The corrosion inhibitor is preferably present at a level of from 10 to 30 ppmw, based on the total aqueous based composition. Any corrosion inhibitor suitable for use in an internal combustion engine can be used herein.

The aqueous based composition can also comprises further optional additives such as colourants, antioxidants, bittering agents e.g. Bitrex (RTM) (active ingredient is Denatonium Benzoate) manufactured by the Macfarlan Smith Corporation and J. M. Johnson Matthey, and the like. Other suitable optional additives include those additives which are also suitable for use in a gasoline additive package and which are well known to those skilled in the art. Examples of such additives are provided below in relation to the description of suitable gasoline additives. For use in the present invention, any such additives may need to be adapted for aqueous phase miscibility.

The balance of the aqueous based composition is water (component (i)). The water is preferably present at a level from 50 vol % to 99 vol %, more preferably from 58 vol % to 98 vol %, based on the total volume of components (i), (ii) and (iii).

The aqueous based composition is preferably prepared by mixing the amine compound and the surfactant in a first step, followed by addition of the freezing point suppression agent, and finally adding the water to produce a clear dispersed solution, e.g. a microemulsion or a continuous phase.

In the uses and methods of the present invention, the engine is fuelled by a gasoline fuel composition and the aqueous based composition is introduced into the engine, for example via an injection system or otherwise. The aqueous based composition can be introduced into the engine either before or during normal operation of the engine. The aqueous based composition can be introduced into the engine in any appropriate manner, preferably in such a way that it creates a washing action on the back of the intake valves, for example via injection into the cylinder, onto the valves or into the manifold.

The aqueous based composition described herein is preferably stored in a separate tank on-board the vehicle, and injected separately from the fuel. Advances in fuel injection systems targeting high efficiency engines provides another opportunity for co-injection using a single dual fuel injector, such as that developed by QuantLogic Corp (http://qlc2.com/) capable of injecting two fluids that are accurately metered and either mixed in the injector to provide a single spray, or injected separately from different design holes in the injector to facilitate mixing in the spray outside the injector.

The aqueous based composition described herein is used for the purpose of reducing intake valve deposits.

In a preferred embodiment herein, the aqueous based composition described herein is used for the dual purpose of reducing intake valve deposits and reducing engine knock.

The uses and methods of the present invention may be used to achieve any degree of reduction in intake valve deposits in the engine, including reduction to zero (i.e. eliminating intake valve deposits). The uses and methods herein preferably achieve a 5% reduction or more in intake valve deposits in the engine, more preferably a 10% reduction or more in intake valve deposits in the engine, even more preferably a 15% reduction or more in intake valve deposits in the engine, and especially a 30% reduction or more in intake valve deposits in the engine. In an especially preferred embodiment, the methods and uses herein achieve a 50% reduction or more in intake valve deposits in the engine. In another especially preferred embodiment, the method and use herein completely removes intake valve deposits in the engine.

In the uses and methods of the present invention the spark ignition internal combustion engine is fuelled with a gasoline fuel composition.

The gasoline fuel composition used herein to fuel the spark ignition internal combustion engine comprises a gasoline base fuel. The gasoline base fuel may be any gasoline base fuel suitable for use in an internal combustion engine of the spark-ignition (gasoline) type known in the art, including automotive engines as well as in other types of engine such as, for example, off road and aviation engines.

The gasoline used as the base fuel in the liquid gasoline fuel composition herein may conveniently also be referred to as 'base gasoline'.

Gasolines typically comprise mixtures of hydrocarbons boiling in the range from 25 to 230° C. (EN-ISO 3405), the optimal ranges and distillation curves typically varying according to climate and season of the year. The hydrocarbons in a gasoline may be derived by any means known in the art, conveniently the hydrocarbons may be derived in any known manner from straight-run gasoline, synthetically-produced aromatic hydrocarbon mixtures, thermally or catalytically cracked hydrocarbons, hydro-cracked petroleum fractions, catalytically reformed hydrocarbons or mixtures of these. All of these gasoline components may be derived from fossil carbon or renewables.

The specific distillation curve, hydrocarbon composition, research octane number (RON) and motor octane number (MON) of the gasoline are not critical for the present invention.

Conveniently, the research octane number (RON) of the gasoline may be at least 80, for instance in the range of from 80 to 110, preferably the RON of the gasoline will be at least 90, for instance in the range of from 90 to 110, more preferably the RON of the gasoline will be at least 91, for instance in the range of from 91 to 105, even more preferably the RON of the gasoline will be at least 92, for instance in the range of from 92 to 103, even more preferably the RON of the gasoline will be at least 93, for instance in the range of from 93 to 102, and most preferably the RON of the gasoline will be at least 94, for instance in the range of from 94 to 100 (EN 25164); the motor octane number (MON) of the gasoline may conveniently be at least 70, for instance in the range of from 70 to 110, preferably the MON of the gasoline will be at least 75, for instance in the range of from 75 to 105, more preferably the MON of the gasoline will be at least 80, for instance in the range of from 80 to 100, most preferably the MON of the gasoline will be at least 82, for instance in the range of from 82 to 95 (EN 25163).

Typically, gasolines comprise components selected from one or more of the following groups; saturated hydrocarbons, olefinic hydrocarbons, aromatic hydrocarbons, and oxygenated hydrocarbons. Conveniently, the gasoline may comprise a mixture of saturated hydrocarbons, olefinic hydrocarbons, aromatic hydrocarbons, and, optionally, oxygenated hydrocarbons.

Typically, the olefinic hydrocarbon content of the gasoline is in the range of from 0 to 40 percent by volume based on the gasoline (ASTM D1319); preferably, the olefinic hydrocarbon content of the gasoline is in the range of from 0 to 30 percent by volume based on the gasoline, more preferably, the olefinic hydrocarbon content of the gasoline is in the range of from 0 to 20 percent by volume based on the gasoline.

Typically, the aromatic hydrocarbon content of the gasoline is in the range of from 0 to 70 percent by volume based on the gasoline (ASTM D1319), for instance the aromatic hydrocarbon content of the gasoline is in the range of from 10 to 60 percent by volume based on the gasoline; preferably, the aromatic hydrocarbon content of the gasoline is in the range of from 0 to 50 percent by volume based on the gasoline, for instance the aromatic hydrocarbon content of the gasoline is in the range of from 10 to 50 percent by volume based on the gasoline.

The benzene content of the gasoline is at most 2 percent by volume, more preferably at most 1 percent by volume based on the gasoline.

The gasoline preferably has a low or ultra low sulphur content, for instance at most 1000 ppmw (parts per million by weight), preferably no more than 500 ppmw, more preferably no more than 100, even more preferably no more than 50 and most preferably no more than even 10 ppmw.

The gasoline also preferably has a low total lead content, such as at most 0.005 g/l, most preferably being lead free—having no lead compounds added thereto (i.e. unleaded).

When the gasoline comprises oxygenated hydrocarbons, at least a portion of non-oxygenated hydrocarbons will be substituted for oxygenated hydrocarbons. The oxygen content of the gasoline may be up to 35 percent by weight (EN 1601) (e.g. ethanol per se (i.e. pure anhydrous ethanol)) based on the gasoline. For example, the oxygen content of the gasoline may be up to 25 percent by weight, preferably up to 10 percent by weight. Conveniently, the oxygenate concentration will have a minimum concentration selected from any one of 0 and 5 percent by weight, and a maximum concentration selected from any one of 30, 20, 10 percent by weight. Preferably, the oxygenate concentration herein is 5 to 15 percent by weight.

Examples of oxygenated hydrocarbons that may be incorporated into the gasoline include alcohols, ethers, and their derivatives, and oxygen containing heterocyclic compounds. Preferably, the oxygenated hydrocarbons that may be incorporated into the gasoline are selected from alcohols (such as methanol, ethanol, propanol, 2-propanol, butanol, tert-butanol, iso-butanol and 2-butanol), ethers (preferably ethers containing 5 or more carbon atoms per molecule, e.g., methyl tert-butyl ether and ethyl tert-butyl ether) and esters (preferably esters containing 5 or more carbon atoms per molecule); a particularly preferred oxygenated hydrocarbon is ethanol.

When oxygenated hydrocarbons are present in the gasoline, the amount of oxygenated hydrocarbons in the gasoline may vary over a wide range. For example, gasolines comprising a major proportion of oxygenated hydrocarbons are currently commercially available in countries such as Brazil and U.S.A., e.g. ethanol per se and E85, as well as gasolines comprising a minor proportion of oxygenated hydrocarbons, e.g. E10 and E5. Therefore, the gasoline may contain up to 100 percent by volume oxygenated hydrocarbons. E100 fuels as used in Brazil are also included herein. Preferably, the amount of oxygenated hydrocarbons present in the gasoline is selected from one of the following amounts: up to 85 percent by volume; up to 70 percent by volume; up to 65 percent by volume; up to 30 percent by volume; up to 20 percent by volume; up to 15 percent by volume; and, up to 10 percent by volume, depending upon the desired final formulation of the gasoline. Conveniently, the gasoline may contain at least 0.5, 1.0 or 2.0 percent by volume oxygenated hydrocarbons.

Examples of suitable gasolines include gasolines which have an olefinic hydrocarbon content of from 0 to 20 percent by volume (ASTM D1319), an oxygen content of from 0 to 5 percent by weight (EN 1601), an aromatic hydrocarbon content of from 0 to 50 percent by volume (ASTM D1319) and a benzene content of from 0 to 1 percent by volume.

Also suitable for use herein are gasoline blending components which can be derived from a biological source. Examples of such gasoline blending components can be found in WO2009/077606, WO2010/028206, WO2010/000761, European patent application nos. 09160983.4, 09176879.6, 09180904.6, and U.S. Patent application Ser. No. 61/312,307.

The base gasoline or the gasoline composition used herein may conveniently include one or more optional fuel additives. The concentration and nature of the optional fuel additive(s) that may be included in the base gasoline or the gasoline composition used herein is not critical. Non-limiting examples of suitable types of fuel additives that can be included in the base gasoline or the gasoline composition used herein include anti-oxidants, corrosion inhibitors, anti-wear additives or surface modifiers, flame speed additives, detergents, dehazers, antiknock additives, metal deactivators, valve-seat recession protectant compounds, dyes, solvents, carrier fluids, diluents and markers. Examples of suitable such additives are described generally in U.S. Pat. No. 5,855,629.

Conveniently, the fuel additives can be blended with one or more solvents to form an additive concentrate, the additive concentrate can then be admixed with the base gasoline or the gasoline composition used herein.

The (active matter) concentration of any optional additives present in the base gasoline or the gasoline composition used herein is preferably up to 1 percent by weight, more preferably in the range from 5 to 2000 ppmw, advantageously in the range of from 300 to 1500 ppmw, such as from 300 to 1000 ppmw.

The fuel compositions may be conveniently prepared using conventional formulation techniques by admixing one or more base fuels with one or more performance additive packages and/or one or more additive components.

To facilitate a better understanding of the present invention, the following examples of certain aspects of some embodiments are given. In no way should the following examples be read to limit, or define, the entire scope of the invention.

Examples

Aqueous based compositions were prepared by blending the components set out in Table 1 below. The polyetheramine used in the Examples was XJT 958 (commercially available from Indorama) which is a nonyl phenol amine containing PO/BO groups in a weight ratio of 65:35 (PO/BO). The surfactants used in the Examples were Surfonic L24-12, Surfonic L24-9, Surfonic L12-8, Surfonic L12-6, Surfonic L24-4, Surfonic N100, Surfonic N60 and Surfonic TDA (all alkyl ethoxylates or alkylaryl ethoxylates commercially available from Indorama having the chemical compositions indicated in Table 1 below). The HLB values of each of these surfactants are indicated in Table 1. The freezing point suppression agents used in the Examples were alcohols (ethanol, 1-propanol, 2-propanol or methanol) in amounts as indicated in Table 1. The balance of the compositions was water.

The Examples were prepared by blending the nonionic surfactant and the amine compound in a first step, followed by addition of the alcohol and finally addition of the water. A visual inspection was then carried out on each of the Examples to determine which of them produced clear micro-emulsions. These results are set out in Table 1.

TABLE 1

| E.g. | Polyetheramine (ppmwt) | Surfactant (vol %) | Surfactant Alkyl group | No. of ethylene oxide repeat units | HLB of surfactant | Alcohol (vol %) | Water vol % |
|---|---|---|---|---|---|---|---|
| 1 | XJT 958 (378.5 ppmwt) | Surfonic L24-12 (0.5 vol %) | C12-C16 | 12 | 14.4 | Ethanol (1 vol %) | 98.5 vol % |
| 2 | XJT 958 (378.5 ppmwt) | Surfonic L24-12 (1 vol %) | C12-C16 | 12 | 14.4 | Ethanol (15 vol %) | 84 vol % |
| 3 | XJT 958 (378.5 ppmwt) | Surfonic L24-12 (1 vol %) | C12-C16 | 12 | 14.4 | Ethanol (25 vol %) | 74 vol % |
| 4 | XJT 958 (378.5 ppmwt) | Surfonic L24-12 (1 vol %) | C12-C16 | 12 | 14.4 | Ethanol (40 vol %) | 59 vol % |
| 5 | XJT 958 (378.5 ppmwt) | Surfonic L24-12 (1 vol %) | C12-C16 | 12 | 14.4 | 1-Propanol (1 vol %) | 98 vol % |
| 6 | XJT 958 378.5 ppmwt | Surfonic L24-12 (1 vol %) | C12-C16 | 12 | 14.4 | 1-Propanol (40 vol %) | 59 vol % |
| 7 | XJT 958 378.5 ppmwt | Surfonic L24-12 (1 vol %) | C12-C16 | 12 | 14.4 | 2-Propanol (15 vol %) | 84 vol % |
| 8 | XJT 958 378.5 ppmwt | Surfonic L24-12 (1 vol %) | C12-C16 | 12 | 14.4 | 2-Propanol (40 vol %) | 59 vol % |
| 9 | XJT 958 378.5 ppmwt | Surfonic L24-9 (1 vol %) | C12-C16 | 9 | 13 | 2-Propanol (1 vol %) | 98 vol % |
| 10 | XJT 958 378.5 ppmwt | Surfonic L12-9 (1 vol %) | C10-C12 | 9 | 13 | 2-Propanol (10 vol %) | 89 vol % |
| 11 | XJT 958 378.5 ppmwt | Surfonic L12-9 (1 vol %) | C10-C12 | 9 | 13 | 2-Propanol (15 vol %) | 84 vol % |
| 12 | XJT 958 378.5 ppmwt | Surfonic L12-9 (1 vol %) | C10-C12 | 9 | 13 | 2-Propanol (25 vol %) | 74 vol % |
| 13 | XJT 958 378.5 ppmwt | Surfonic L24-9 (1 vol %) | C12-C16 | 9 | 13 | 2-Propanol (30 vol %) | 69 vol % |

TABLE 1-continued

| E.g. | Polyetheramine (ppmwt) | Surfactant (vol %) | Surfactant Alkyl group | No. of ethylene oxide repeat units | HLB of surfactant | Alcohol (vol %) | Water vol % |
|---|---|---|---|---|---|---|---|
| 14 | XJT 958 378.5 ppmwt | Surfonic L24-9 (1 vol %) | C12-C16 | 9 | 13 | 2-Propanol (40 vol %) | 59 vol % |
| 15 | XJT 958 378.5 ppmwt | Surfonic L24-9 (1 vol %) | C12-C16 | 9 | 13 | 1-Propanol (1 vol %) | 98 vol % |
| 16 | XJT 958 378.5 ppmwt | Surfonic L24-9 (1 vol %) | C12-C16 | 9 | 13 | 1-Propanol (40 vol %) | 59 vol % |
| 17 | XJT 958 378.5 ppmwt | Surfonic L24-9 (1 vol %) | C12-C16 | 9 | 13 | methanol (1 vol %) | 98 vol % |
| 18 | XJT 958 378.5 ppmwt | Surfonic L24-9 (1 vol %) | C12-C16 | 9 | 13 | methanol (40 vol %) | 59 vol % |
| 19 | XJT 958 378.5 ppmwt | Surfonic L12-8 (1 vol %) | C10-C12 | 8 | 13.6 | Ethanol (1 vol %) | 98 vol % |
| 20 | XJT 958 378.5 ppmwt | Surfonic L12-8 (1 vol %) | C10-C12 | 8 | 13.6 | Ethanol (40 vol %) | 59 vol % |
| 21 | XJT 958 378.5 ppmwt | Surfonic L12-6 (1 vol %) | C10-C12 | 6 | 12.4 | Ethanol (1 vol %) | 98 vol % |
| 22 | XJT 958 378.5 ppmwt | Surfonic L12-6 (1 vol %) | C10-C12 | 6 | 12.4 | Ethanol (10 vol %) | 89 vol % |
| 23 | XJT 958 378.5 ppmwt | Surfonic L12-6 (1 vol %) | C10-C12 | 6 | 12.4 | Ethanol (20 vol %) | 79 vol % |
| 24 | XJT 958 378.5 ppmwt | Surfonic L12-6 (1 vol %) | C10-C12 | 6 | 12.4 | Ethanol (30 vol %) | 69 vol % |
| 25 | XJT 958 378.5 ppmwt | Surfonic L12-6 (1 vol %) | C10-C12 | 6 | 12.4 | Ethanol (40 vol %) | 59 vol % |
| 26 | XJT 958 378.5 ppmwt | Surfonic L12-6 (1 vol %) | C10-C12 | 6 | 12.4 | 2-Propanol (1 vol %) | 98 vol % |
| 27 | XJT 958 378.5 ppmwt | Surfonic L12-6 (1 vol %) | C10-C12 | 6 | 12.4 | 2-Propanol (10 vol %) | 89 vol % |
| 28 | XJT 958 378.5 ppmwt | Surfonic L12-6 (1 vol %) | C10-C12 | 6 | 12.4 | 2-Propanol (20 vol %) | 79 vol % |
| 29 | XJT 958 378.5 ppmwt | Surfonic L12-6 (1 vol %) | C10-C12 | 6 | 12.4 | 2-Propanol (30 vol %) | 69 vol % |
| 30 | XJT 958 378.5 ppmwt | Surfonic L12-6 (1 vol %) | C10-C12 | 6 | 12.4 | 2-Propanol (40 vol %) | 59 vol % |
| 31 | XJT 958 378.5 ppmwt | Surfonic L24-4 (1 vol %) | C12-C16 | 4 | 9.4 | Ethanol (1 vol %) | 98 vol % |
| 32 | XJT 958 378.5 ppmwt | Surfonic L24-4 (1 vol %) | C12-C16 | 4 | 9.4 | Ethanol (2 vol %) | 97 vol % |
| 33 | XJT 958 378.5 ppmwt | Surfonic L24-4 (1 vol %) | C12-C16 | 4 | 9.4 | Ethanol (40 vol %) | 59 vol % |
| 34 | XJT 958 378.5 ppmwt | Surfonic N100 (1 vol %) | C9 phenol | 10 | 13.3 | Ethanol (1 vol %) | 98 vol % |
| 35 | XJT 958 378.5 ppmwt | Surfonic N100 (1 vol %) | C9 phenol | 10 | 13.3 | Ethanol (40 vol %) | 59 vol % |
| 36 | XJT 958 378.5 ppmwt | Surfonic N100 (2 vol %) | C9 phenol | 10 | 13.3 | Ethanol (40 vol %) | 58 vol % |
| 37 | XJT 958 378.5 ppmwt | Surfonic N100 (1 vol %) | C9 phenol | 10 | 13.3 | 2-Propanol (40 vol %) | 59 vol % |
| 38 | XJT 958 378.5 ppmwt | Surfonic N60 (1 vol %) | C9 phenol | 6 | 10.9 | Ethanol (1 vol %) | 98 vol % |

TABLE 1-continued

| E.g. | Polyetheramine (ppmwt) | Surfactant (vol %) | Surfactant Alkyl group | No. of ethylene oxide repeat units | HLB of surfactant | Alcohol (vol %) | Water vol % |
|---|---|---|---|---|---|---|---|
| 39 | XJT 958 378.5 ppmwt | Surfonic N60 (1 vol %) | C9 phenol | 6 | 10.9 | Ethanol (40 vol %) | 59 vol % |
| 40 | XJT 958 378.5 ppmwt | Surfonic N60 (2 vol %) | C9 phenol | 6 | 10.9 | Ethanol (40 vol %) | 58 vol % |
| 41 | XJT 958 378.5 ppmwt | Surfonic TDA-6 (1 vol %) | C12 branched | 6 | 11.4 | Ethanol (1 vol %) | 98 vol % |
| 42 | XJT 958 378.5 ppmwt | Surfonic TDA-6 (1 vol %) | C12 branched | 6 | 11.4 | Ethanol (40 vol %) | 59 vol % |

DISCUSSION

Clear and stable aqueous based compositions of detergent/water/freeze point suppression agent can be achieved with the correct surfactant. The preferred surfactant was alkyl-based with an HLB range between 14.4-13. Surfactants like Surfonic L24-12, Surfonic L24-9 and Surfonic L12-8 with a specially selected alcohol were particularly good at generating a clear and stable aqueous based composition with the polyether amine detergent.

The Examples in Table 1 above can be injected into a direct injected spark ignition (GDI) engine before start-up of the engine in order to reduce intake valve deposits and in order to reduce engine knock.

We claim:

1. Method for reducing intake valve deposits in a spark ignition internal combustion engine which is fuelled with a gasoline fuel composition wherein the method comprises introducing into the engine an aqueous based composition, wherein the aqueous based composition comprises (i) from 58 to 98 vol % water, based on the total volume of components (i), (ii) and (iii), (ii) from 1 vol % to 40 vol % of freezing point suppression agent, based on the total volume of components (i), (ii) and (iii), selected from alcohols, glycols, dialkyl carbamates, and mixture thereof, (iii) from 1 vol % to 10 vol % of surfactant, based on the total volume of components (i), (ii) and (iii), wherein the surfactant is a nonionic surfactant not encompassing an amine compound according to (iv), and (iv) an amine compound selected from polyalkylene based amine compounds, polyetheramine compounds, and mixtures thereof, in a blending amount of from 100 ppmw to 1000 ppmw, based on parts of amine compound per million weight parts of components (i), (ii) and (iii) in combination, wherein the aqueous based composition is stored in a separate tank and introduced into the engine via an injection system and is injected separately from the fuel in such a way that it creates a washing action on the back of intake valves of said engine by injection into the cylinder, onto the valves or into the manifold of said engine.

2. Method according to claim 1 wherein the spark ignition internal combustion engine is a direct injection spark ignition internal combustion engine.

3. Method according to claim 1, wherein the amine compound is a polyetheramine.

4. Method according to claim 1, wherein the surfactant has an HLB in the range from 12.4 to 14.4.

5. Method according to claim 1 wherein the nonionic surfactant is selected from alkyl alcohol ethoxylates, alkylphenol ethoxylates, and mixtures thereof.

6. Method according to claim 1, wherein the nonionic surfactant is an alkyl alcohol ethoxylate.

7. Method according to claim 1, wherein the aqueous based composition comprises from 1.0 vol % to 5 vol % of surfactant.

8. Method according to claim 1, wherein the freezing point suppression agent is an alcohol.

9. Method according to claim 8, wherein the alcohol is selected from methanol, ethanol, propanol, isopropanol, butanol, isobutanol, and mixtures thereof.

10. Method according to claim 1, wherein the aqueous based composition is injected into the engine before start-up of the engine.

11. Method according to claim 1, wherein the amine compound is an alkyl or alkyaryl polyetheramine.

12. Method according to claim 6, wherein the nonionic surfactant is an alkyl alcohol ethoxylate derived from a C10-C16 alkyl alcohol and having from 6 to 12 ethylene oxide moieties.

13. Method according to claim 1, wherein the glycols are selected from alkylene glycols.

* * * * *